UNITED STATES PATENT OFFICE.

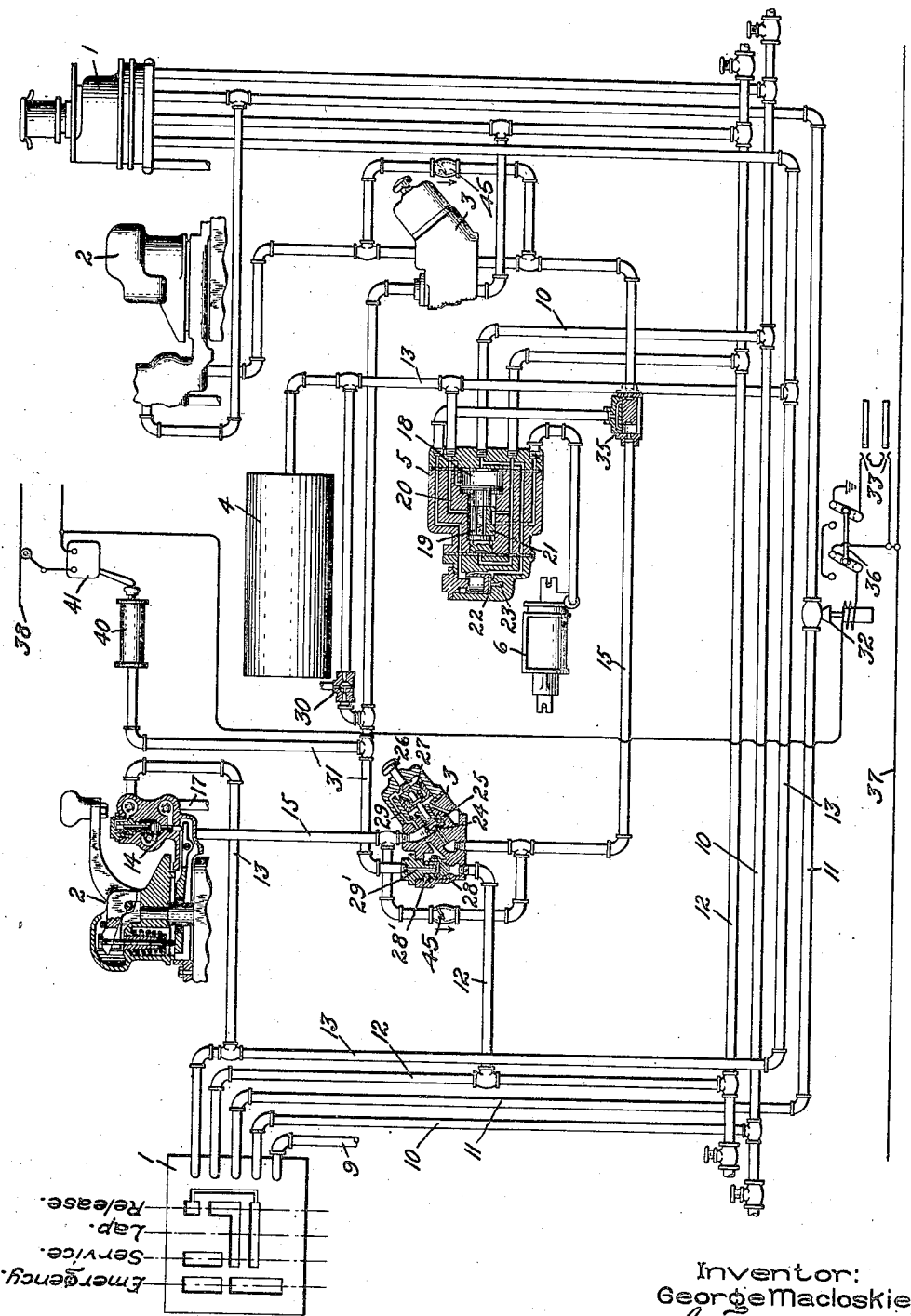

GEORGE MACLOSKIE, OF ERIE, PENNSYLVANIA, ASSIGNOR TO GENERAL ELECTRIC COMPANY, A CORPORATION OF NEW YORK.

SAFETY CAR-CONTROL EQUIPMENT.

1,421,796.	Specification of Letters Patent.	Patented July 4, 1922.

Application filed February 19, 1921. Serial No. 446,433.

*To all whom it may concern:*

Be it known that I, GEORGE MACLOSKIE, a citizen of the United States, residing at Erie, county of Erie, State of Pennsylvania, have invented certain new and useful Improvements in Safety Car-Control Equipments, of which the following is a specification.

My invention relates to air brake and safety car control equipments for traction cars in which the brakes are automatically applied when the operator removes his hand from the controller handle at the operating end of the car.

One object of my invention is to provide in such an equipment an arrangement whereby the safety control features of a car may be readily rendered inoperative without affecting the operation of the air brake equipment so that the car may be used as a trailer and the air brakes thereof controlled by the air brake and safety car control equipment on the head operating car.

Another object of my invention is to provide an arrangement whereby the necessary changes have to be made in the connections of the safety car control equipment before the car can be operated either as an operating car or as a trailer.

Another object of my invention is to provide an improved arrangement whereby the brakes of a car cannot be released until all of the car doors are closed.

My invention will be better understood from the following description taken in connection with the accompanying drawing, and its scope will be pointed out in the appended claims.

In the accompanying drawing, the single figure is a diagrammatic view, partly in section, of a double end air brake and safety car control equipment embodying my invention.

As shown in the drawing, the equipment comprises the well known air brake and safety car control equipment which consists of a motorman's valve 1 for controlling the air brakes, a controller 2 for controlling the current to the car motors and a combined foot and cut off valve 3 at each end of the car, a main reservoir 4, an emergency valve device 5 and a brake cylinder 6.

The motorman's valve 1 may be of any desired construction and in the particular arrangement shown in the drawing has the following pipes connected thereto: An emergency exhaust pipe 9, an emergency brake pipe 10, a straight air exhaust pipe 11, a straight air brake pipe 12 and a main reservoir pipe 13. The diagrammatic development of the motorman's valve shown at the left of the drawing clearly shows the connections made by the motorman's valve when the valve handle is placed in the various operating positions.

The controller 2 is shown as being of the well known type in which the removal of the operator's hand from the controller handle operates a double beat pilot valve 14 to cut off communication between the main reservoir pipe 13 and a safety control pipe 15 and to establish communication between the safety control pipe 15 and an exhaust pipe 17.

The emergency valve device 5 is shown as comprising a casing having a piston chamber 18 connected to the emergency pipe 10 and a valve chamber 19 connected by the passage 20 to the main reservoir pipe 13 and containing a slide valve 21, which in the normal position of the emergency valve establishes communication between the straight air pipe 12 and the brake cylinder 6, and in the emergency position establishes communication between the valve chamber 19, which is connected by means of the passage 20 to the main reservoir pipe 13, and the brake cylinder 6. The emergency valve also contains a relay valve 22 which controls communication between the emergency brake pipe 10 and the exhaust port 23. The relay valve is normally held in its closed position by fluid supplied through the safety control pipe 15. When, however, fluid is vented from the safety control pipe, the relay valve opens and establishes communication between the emergency pipe 10 and the exhaust port 23, thereby causing the emergency valve 5 to move to its emergency position.

In order to relieve the operator from the obligation of holding the controller handle down all the time the car is in motion to prevent the safety control pipe 15 from being connected to atmosphere, the combined cut off and foot valve 3 is provided in the safety control pipe at each operating end of the car. Each valve 3 comprises a valve 24 which is normally held off its seat by a spring 25 and is adapted to cut off the communication through the safety control pipe 15 at the corresponding end of the car upon pressure being applied to the push button 26. A piston 27, having one side subject to pressure in the straight air brake pipe 12 supplied through a holdback valve 28 and a passage 29, is also adapted to close the valve 24 so that communication through the safety control pipe 15 is cut off when a straight air application of the brakes is made. The hold-back valve 28 is provided to prevent the operation of the piston 27 until the straight air pipe pressure has reached a predetermined value. The holdback valve 28 is normally held on its seat by a spring 28'. The passage 29 is normally connected to atmosphere by means of port 29'. The valve 28, however, is arranged to cut off communication between the passage 29 and the port 29' when the valve is moved off of its seat by fluid pressure in the straight air pipe 12.

A double check valve 35 is provided in the safety control pipe between the combined foot and cut off valves 3. The purpose of this double check valve is to cut off communication between the relay valve 22 of the emergency valve 5 and the pilot valve 14 at the non-operating end of the car, which at this time connects the safety control pipe 15 to the exhaust port 17 at this end of the car. A non-return check valve 45 is placed in a by-pass around each valve 24 so that when the operator makes a straight air application of the brakes, then moves to the operating end of the car and depresses the controller handle at that end, fluid will flow through the check valve 45 at the new operating end of the car to the control pipe 15 at that end. Then when the motorman moves the brake valve 1 into the release position to release the brake before starting the car, thereby effecting the closing of the hold-back valves 28 and opening of the valves 24 of the combined foot and cut off valves 3, so that the safety control pipe 15 at the non-operating ends is connected to atmosphere, the pressure on the new operating side of the double check valve 35 causes this valve to move immediately to its other position and cut off communication to the control pipe 15 extending to the non-operating end before sufficient fluid has been vented through this control pipe to effect the operation of the relay valve 22 to produce an emergency application of the brakes.

The equipment above described is standard apparatus and well known in the art.

In order to render the safety control features of this apparatus inoperative so that the car on which the apparatus is mounted may be used as a trailer and the brakes thereof controlled by the safety car control and air brake equipment on the head operating car, I connect the ports 29' of the combined foot and cut off valves 3 together by means of a pipe 31. In this pipe 31 I connect a three-way cut out cock 30 which in one position connects the pipe 31 to atmosphere and in another position connects the pipe 31 to the reservoir pipe 13. To the pipe 31 I also connect a fluid-operated circuit breaker cylinder 40 which is arranged to open the circuit breaker 41 whenever fluid under pressure is supplied thereto. The circuit breaker 41 controls the circuit of the car motors. In order to prevent the brakes of the car from being released before the car doors are closed, I provide a magnet valve 32 in the exhaust pipe 11. The magnet valve 32 is arranged to cut off communication between exhaust pipe 11 and atmosphere when in its deenergized position. One end of the coil of magnet valve 32 is connected to the trolley 38 by means of the circuit breaker 41 and the other end of the coil is adapted to be connected to ground through the door switches 33 when the switch 36 is in one position and to the train wire 37 when the switch 36 is in the other position.

In order that an emergency application of the brakes may be made independently of the position of the doors, I provide each brake valve 1 with an additional exhaust pipe 9 which is adapted to be connected to the emergency pipe 10 when the brake valve is in the emergency position.

The operation of the equipment shown is as follows: When the car is operated alone the cut out cock 30 is turned so that it establishes communication between the pipe 31 and atmosphere, and the switch 36 is placed in the position shown in the drawing. Consequently, the safety control features of the car function in the ordinary manner. As long as the motorman keeps the controller handle 2 depressed at the operating end of the car, fluid under pressure is supplied from the main reservoir pipe 13 to the safety control pipe 15 thereby maintaining the relay valve 22 on its seat. In case, however, the motorman releases the controller handle while the car is running, this communication between the main reservoir pipe 13 and the safety control pipe 15 is cut off and communication is established between the safety control pipe 15 and the exhaust pipe 17. The relay valve 22 then operates to establish communication between the emergency pipe 10 and the exhaust port 23, thereby causing the operation of the emergency valve 5 to effect an emergency application of the brakes. If the motorman desires to release the controller handle without producing an emergency application of the brakes, he may do so by first depressing the push button 26 of the combined foot and cut off valve 3 so as to close the valve 24 to cut off communication between the relay valve 22 and the pilot valve 14 at the operating end. The controller handle may also be released after a service application of the brakes without effecting the operation of the relay valve 22 since admission of fluid under pressure to the straight air pipe 12 opens the valves 28 and establishes communication between the straight air pipe 12 and one side of the pistons 27 connected to the valves 24. The valves 24 then close and cut off communication between the relay valve 22 and the pilot valves 14.

The brakes are controlled in the usual manner by moving the brake valve 1 to the various brake positions. It will be apparent, however, that the brakes cannot be released until all of the car doors have been closed and the circuit of the magnet valve 32 completed.

In order that an emergency application of the brakes may be made at all times independently of the positions of the doors, each brake valve is arranged in its emergency position to establish communication between the emergency pipe 10 and an exhaust pipe 9 connected directly to atmosphere.

When the car is used as the head operating car of a train, the cut out cock 30 is placed in the same position it occupies when the car is being operated alone, but the switch 36 is moved into its other position so that the coil of the magnet valve 32 is now connected through the door switches 33 to the train wire 37 which in turn is connected to the corresponding train wire 37 of the trailer and through the door switches 33 on the trailer to ground. The operation of the equipment is the same as when the car is being operated alone except that the brakes cannot be released until all of the car doors on the train are closed.

When the car is operated as a trailer, the cut out cock 30 is turned so that it establishes communication between the main reservoir pipe 13 and the pipe 31, and the switch 36 is placed in the position shown so that the door switches 33 thereof are connected in series with the magnet valve 32 on the head operating car. Fluid under pressure now flows from the main reservoir pipe through the ports 29' into the passages 29 so that the valves 24 of the combined foot and cut off valves 3 are closed to cut off communication between the relay valve 22 and the pilot valves 14. The fluid pressure in the passages 29 also prevents the hold-back vlaves 28 from opening when a straight air application of the brakes is made. It is apparent, therefore, that with the cut out cock 30 in this position the safety control features are rendered inoperative so that both of the controller handles on the car may be released at the same time without affecting an emergency application of the brakes. The brakes of the car, however, may be controlled by the safety control and air brake equipment on the head operating car in the usual manner since the brake valves 1 on the car are in the lap position and the straight air pipe 12 and the emergency pipe 10 are connected to corresponding pipes on the head operating car.

In order that the motorman will be made to place the cut out cock 30 in the proper position, depending upon whether the car is an operating car or a trailer, the circuit breaker cylinder 40 is connected to the pipe 31 and so arranged that when fluid pressure is supplied thereto, the plunger opens the circuit breaker 41. With this arrangement, it will be obvious that when the cut out cock 30 is in a position to render the safety control features inoperative so that the car may be operated as a trailer, the plunger of the circuit breaker 40 maintains the circuit breaker 41 in its open position, thereby preventing the motorman from closing the circuit breaker 41. When however, the cut out cock 30 is in the position to render the safety control features operative so that the car may be used as an operating car, the plunger of the circuit breaker is in its normal position so that the motorman is able to close the circuit breaker and operate the car motors by means of the controller 2 at the operating end.

While I have shown and described one embodiment of my invention, I do not desire to be limited to the exact arrangement shown, but seek to cover in the appended claims all those modifications which come within the spirit and scope of my invention.

What I claim as new and desire to secure by Letters Patent of the United States, is:—

1. In a safety car control equipment, the combination of a source of fluid pressure, a brake cylinder, a safety control pipe, a valve device operated by venting fluid from said safety control pipe for establishing communications between said source and brake cylinder, a controller handle, a pilot valve operated upon the release of said handle for venting fluid from said control pipe, a fluid operated power circuit breaker, and a manually controlled valve adapted to control the communication through said control pipe and the communication to said circuit breaker so that when said valve is in one position said valve device is operated to apply the brakes when said controller handle is released and said circuit breaker is closed, and when in another position said circuit breaker is opened and the release of said controller handle does not affect the operation of said emergency valve to apply the brakes.

2. In a safety car control equipment, the combination of a source of fluid pressure, a brake cylinder, a safety control pipe, a valve device operated by venting fluid from said safety control pipe for establishing communication between said source and brake cylinder, a controller handle, a pilot valve operated upon the release of said handle for venting fluid from said control pipe, a fluid-operated power circuit breaker, and a manually controlled valve adapted to effect the opening of said power circuit breaker and the cutting off of communication between said valve device and said pilot valve so that said valve device is not operated upon the release of said handle.

3. In a safety car control equipment, the combination of a source of fluid pressure, a brake cylinder, a safety control pipe, a valve device operated by venting fluid from said control pipe for establishing communication between said source and brake cylinder, a controller handle, a pilot valve operated upon release of said handle for venting fluid from said control pipe, a fluid-pressure operated valve adapted to cut off communication from said valve device to said pilot valve, a fluid-operated power circuit breaker, and a manually controlled valve for effecting the operation of said fluid-pressure-operated valve to cut off communication from said valve device to said pilot valve so that said valve device is not operated upon the release of said handle and for effecting the operation of said power circuit breaker.

4. In a safety car control equipment, the combination of a source of fluid pressure, a brake cylinder, a safety control pipe, a valve device operated by venting fluid from said control pipe for establishing communication between said source and brake cylinder, a controller handle, a pilot valve operated upon the release of said handle for venting fluid from said control pipe, a fluid-pressure-operated valve in said safety control pipe adapted to cut off communication from said valve device to said pilot valve, a fluid-operated power circuit breaker, a manually controlled valve for establishing communication between said source of pressure and said fluid-pressure-operated valve to cut off communication between said valve device and said pilot valve and for establishing communication between said source of fluid pressure and said power circuit breaker.

5. In a safety car control equipment, the combination of a source of fluid pressure, a brake cylinder, a safety control pipe, a valve device operated by venting fluid from said control pipe for establishing communication between said source and brake cylinder, a controller handle, a pilot valve operated upon the release of said handle for venting fluid from said control pipe, a fluid-pressure-operated valve in said safety control pipe adapted to cut off communication from said valve device to said pilot valve, a straight air pipe, a motorman's valve controlling communication between said source and said straight air pipe, a normally closed valve adapted to be opened by fluid supplied to said straight air pipe to establish communication from said straight air pipe to said fluid-operated valve in said safety control pipe to cut off communication between said valve device and said pilot valve, and means adapted to be operated to prevent the operation of said normally closed valve by fluid supplied to said straight air pipe and to effect the operation of said fluid-operated valve in said safety control pipe.

6. In a safety car control equipment, the combination of a source of fluid pressure, a brake cylinder, a safety control pipe, a valve device operated by venting fluid from said control pipe for establishing communication between said source and brake cylinder, a controller handle, a pilot valve operated upon the release of said handle for venting fluid from said control pipe, a fluid-pressure-operated valve in said safety control pipe adapted to cut off communication from said valve device to said pilot valve, a straight air pipe, a motorman's valve controlling communication between said source and said straight air pipe, a normally closed valve adapted to be opened by fluid supplied to said straight air pipe to establish communication from said straight air pipe to said fluid-operated valve in said safety control pipe to cut off communication between said valve device and said pilot valve, a fluid-operated power circuit breaker, and means adapted to be operated to prevent the opening of said normally closed valve by fluid supplied to said straight air pipe and to effect the operation of said fluid-operated valve in said safety control pipe and of said fluid-operated power circuit breaker.

7. In an air brake equipment, a source of fluid pressure, a straight air pipe, an exhaust pipe, a motorman's valve controlling the connection of said straight air pipe to said source and to said exhaust pipe, and a valve device in said exhaust pipe controlled by the car doors.

8. In an air brake equipment, a source of fluid pressure, a straight air pipe, an exhaust pipe, a motorman's valve controlling the connection of said straight air pipe to said source and to said exhaust pipe, a normally closed magnet valve in said exhaust pipe and a circuit for said magnet valve controlled by the car doors.

9. In a straight air emergency air brake equipment, a source of fluid pressure, a straight air pipe, an emergency pipe, an exhaust pipe, a magnet valve connected to said exhaust pipe and arranged when deenergized to cut off communication through said exhaust pipe, a circuit for said magnet valve controlled by the car doors, a second exhaust pipe connected directly to atmosphere, and a motorman's valve arranged in the release position to connect said straight air pipe to said first mentioned exhaust pipe and in the emergency position to connect said emergency pipe to said second exhaust pipe.

In witness whereof, I have hereunto set my hand this 17th day of February, 1921.

GEORGE MACLOSKIE.